E. C. FREEMAN.
VALVE.
APPLICATION FILED DEC. 16, 1912.
1,189,086.
Patented June 27, 1916.
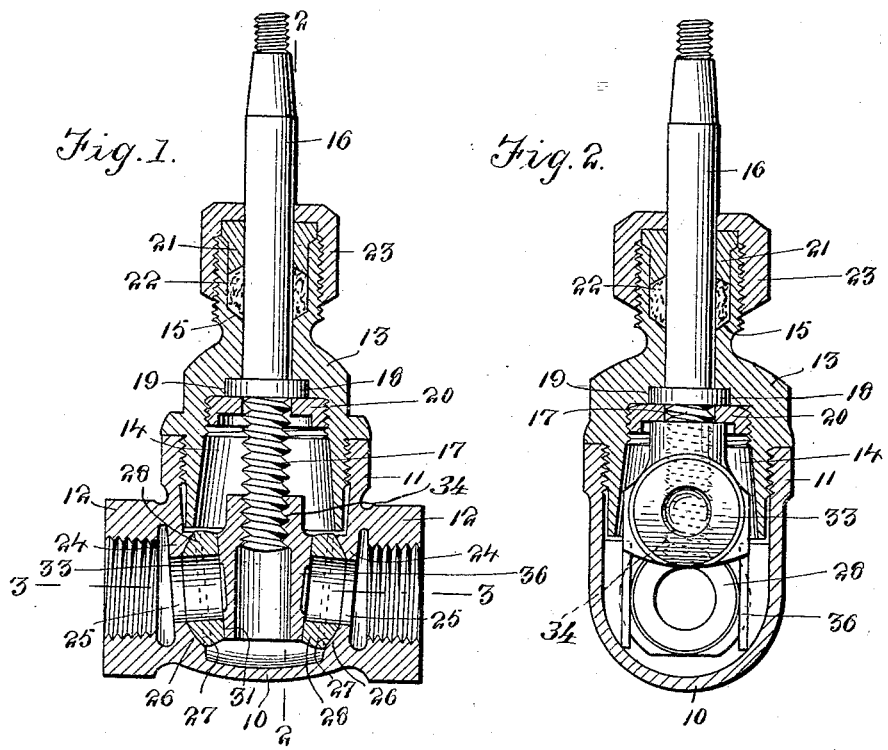
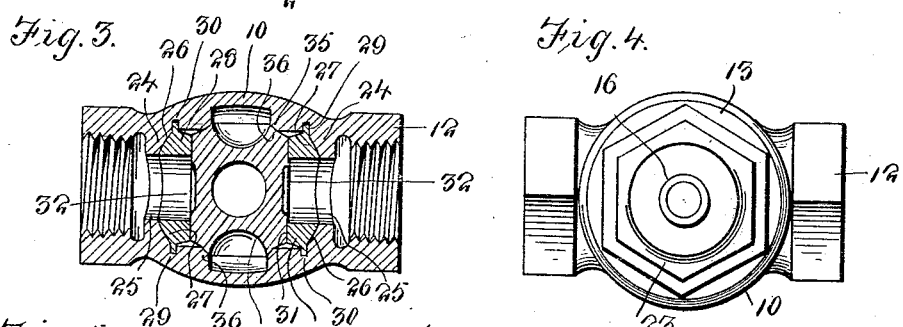
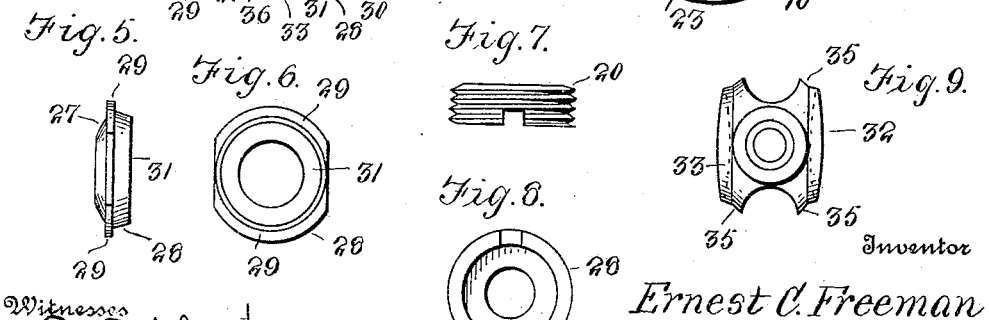
Witnesses
Inventor
Ernest C. Freeman
By Victor J. Evans
Attorney

UNITED STATES PATENT OFFICE.

ERNEST C. FREEMAN, OF BINGHAMTON, NEW YORK.

VALVE.

1,189,086. Specification of Letters Patent. Patented June 27, 1916.

Application filed December 16, 1912. Serial No. 736,926.

*To all whom it may concern:*

Be it known that I, ERNEST C. FREEMAN, a citizen of the United States, residing at Binghamton, in the county of Broome and State of New York, have invented certain new and useful Improvements in Valves, of which the following is a specification.

The invention relates to valves, and more particularly to the class of gate valves.

The primary object of the invention is the provision of a valve wherein there are arranged movable seat rings which permit the true seating of the gate for the closing of the valve.

Another object of the invention is the provision of a valve wherein the seat rings are mounted in a novel manner for the automatic adjustment thereof to assure the proper seating of the gate when closed.

A further object of the invention is the provision of a valve wherein the seat rings will assure the proper seating of the gate thereby for accommodation of any variation in the machining of the parts of the valve in the making thereof.

A further object of the invention is the provision of a valve which is simple in construction, reliable and efficient in operation, possessing few parts, thus permitting the easy assembling of the same as well as allowing the renewal of any worn parts, and also which can be manufactured by a minimum expense.

With these and other objects in view, the invention consists in the construction, combination and arrangement of parts as will be hereinafter fully described, illustrated in the accompanying drawing, and pointed out in the claim hereunto appended.

In the drawing:—Figure 1 is a vertical longitudinal sectional view through a valve constructed in accordance with the invention. Fig. 2 is a sectional view on the line 2—2 of Fig. 1. Fig. 3 is a sectional view on the line 3—3 of Fig. 1. Fig. 4 is a top plan view. Fig. 5 is an edge elevation of one of the seat rings. Fig. 6 is a plan view of the same. Fig. 7 is an edge elevation of the spindle retaining ring. Fig. 8 is a plan view thereof. Fig. 9 is an end view of the gate.

Similar reference characters indicate corresponding parts throughout the several views in the drawing.

Referring to the drawing in detail, the valve comprises a hollow body or casing 10 formed with an internally threaded neck 11 and oppositely disposed internally threaded nipples 12, the same being at right angles to the neck 11, which has detachably mounted therein a cap 13 formed with recesses 14 and 15 in the inner and outer end respectively thereof. Within the cap 13 is mounted the valve stem or spindle 16, which is formed with a threaded inner end 17 for the adjustable connection therewith of a gate hereinafter described.

The stem or spindle 16 at the inner end of the threaded portion 17 is formed with an annular shoulder 18 which rotatably fits within a counter-seat 19 formed in the cap 13, the shoulder 18 being held within the counter-seat by means of a retaining ring 20 detachably threaded in the inner end of the recess 14, while slidably fitted in the recess 15 and surrounding the stem or spindle 16 is a stuffing sleeve 21 which is adapted to act upon suitable packing 22 held within the said recess 15 to prevent leakage through the cap 13 about the stem or spindle. The cap has adjustably threaded thereon at its outer end a packing nut 23 which works against the sleeve 21 to hold the packing 22 tight within the recess 15 about the stem or spindle 16 and in the cap of the valve.

The opposite walls 24 of the body of the casing at the inner ends of the nipples 12 are formed with apertures 25, and in the inner faces of these walls concentrically about the apertures are concaved seats 26 in which rest the correspondingly shaped or convex faces 27 of adjustable seat rings 28, the same being formed with flanges 29 which engage guideways 30 formed in opposite sides of the body or casing 10 interiorly thereof. The seat rings 28 are formed with flat contacting faces 31 with which engage the faces 32 of a wedge-shaped slidable gate 33, the same being formed with an internally threaded opening 34 in which is engaged the inner threaded end 17 of the spindle or stem 16 so that on the turning of the latter the gate 33 will be raised or lowered for the opening or closing of the valve, as will be apparent.

The gate 33 is formed with opposed guide ribs 35 which engage in a guideway 36 formed interiorly of the body or casing 10 so that the gate will be guided in its movement when the valve is being opened or closed. It will be apparent that when the gate 33 is lowered between the seat rings 28 the latter, by reason of their mounting in the valve casing or body 10, will automatically adjust themselves to accommodate the gate therebetween for the proper seating thereof.

To open the valve it is necessary to turn the stem or spindle 16 in one direction, which causes the threaded inner end 17 thereof to work within the threaded opening 34 in the gate 33, lifting the latter to open position. Now, on turning the stem or spindle 16 in the reverse direction the gate 33 is lowered between the seat rings 28, the faces 32 of the gate being brought into sliding engagement with the contacting faces 31 of the seat ring, causing the latter to automatically adjust themselves for the true and proper seating of the gate for the closing of the valve.

From the foregoing it is thought that the construction and manner of operation of the device will be clearly understood, and therefore a more extended explanation has been omitted.

What is claimed is:—

A valve comprising a casing having a passage therethrough and a valve chamber intersecting the same, the said valve chamber being provided in its opposite walls with concave seats concentrically disposed with respect to the said passage and arranged in downwardly convergent relation, the said seat having its opposite walls formed with downwardly convergent guideways, seat rings having convexed faces correspondingly shaped to the seats and engaged therein, unbroken ribs at diametrically opposite points of the rings and slidably engaged in the guideways, a wedge shaped valve gate movable between the said rings, the said valve body having its internal opposite walls formed with guideways at a point medially between the first named guideways, beveled sides formed on the gate and engageable in the last named guideways, a cap on the valve body, and a stem rotatably mounted on the cap and having threaded engagement with the valve gate for raising and lowering the same on the turning of the stem.

In testimony whereof I have affixed my signature in presence of two witnesses.

ERNEST C. FREEMAN.

Witnesses:
S. A. VALENTINE,
H. C. WHITTAKER.

Copies of this patent may be obtained for five cents each, by addressing the "Commissioner of Patents, Washington, D. C."